Feb. 18, 1941.                 R. W. GRACE                 2,232,602
                            TERMINAL CONNECTION
                          Filed Aug. 11, 1939          2 Sheets-Sheet 1

Inventor
Richard W. Grace
By Frease and Bishop
Attorneys

Feb. 18, 1941. R. W. GRACE 2,232,602
TERMINAL CONNECTION
Filed Aug. 11, 1939 2 Sheets-Sheet 2
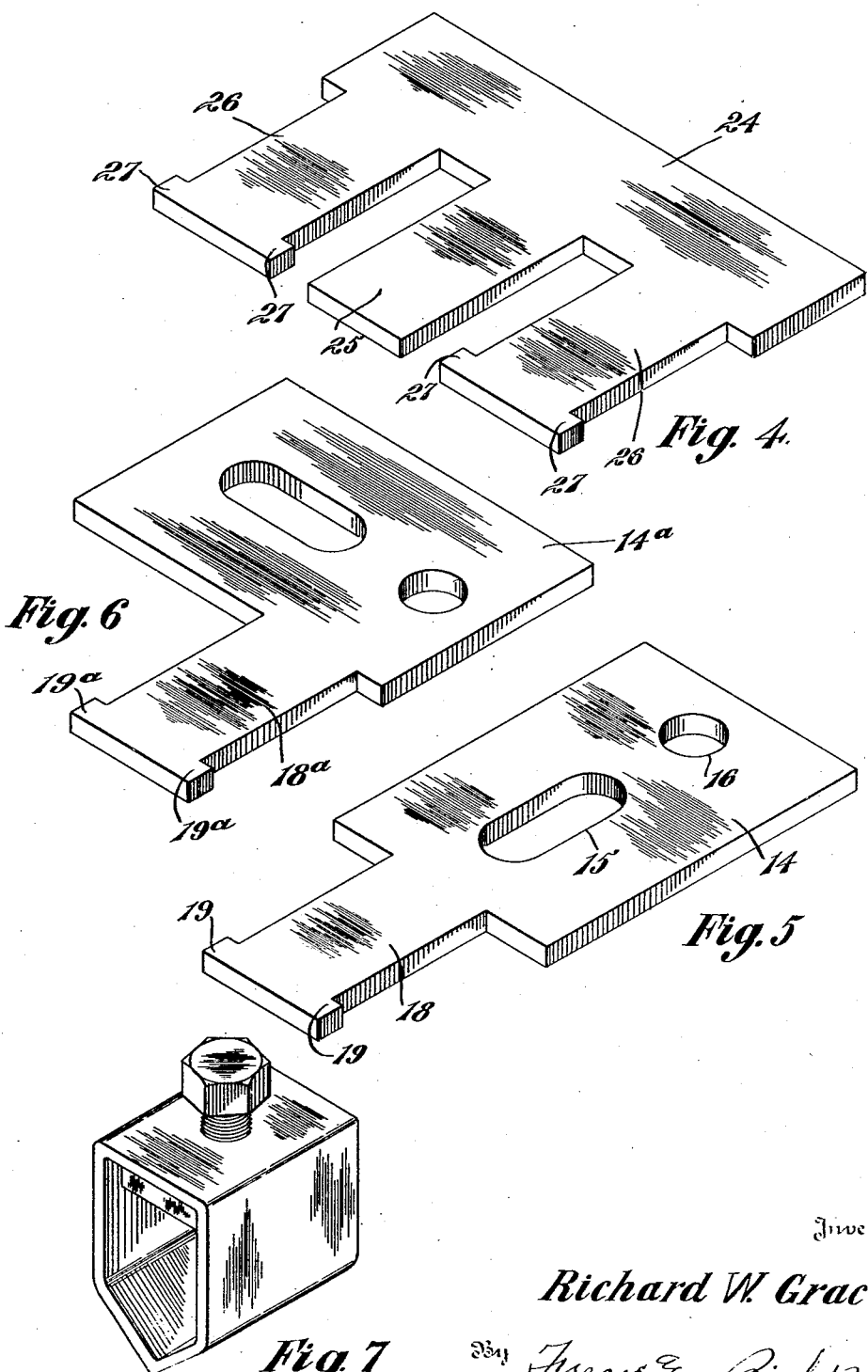
Inventor
Richard W. Grace Patented Feb. 18, 1941

2,232,602

UNITED STATES PATENT OFFICE 2,232,602

TERMINAL CONNECTION

Richard W. Grace, Canton, Ohio, assignor to The Superior Switchboard & Devices Company, Canton, Ohio, a corporation of Ohio Application August 11, 1939, Serial No. 289,659

4 Claims. (Cl. 173—324)

The invention relates to a construction of coupling especially designed for connecting conductor wires or cables to the terminals of current transformers, although the invention is applicable for the connection of conductors to other electrical devices.

The terminals of current transformers have been standardized and are now generally of uniform size and shape, comprising a flat copper plate or bar provided with a longitudinally disposed slot and a substantially circular aperture spaced slightly therefrom.

Various, more or less unsatisfactory, devices have been provided for attaching line conductors to said terminals, and considerable difficulty is experienced in connecting varying numbers of conductor wires or cables to said terminals, as well as conductors of different sizes.

It has also been found difficult to properly connect, to such terminals, conductor wires or cables which lead from above or below the terminals, or are otherwise located at an angle to the terminal.

The object of the present invention is to provide a terminal connection or coupling which is designed to quickly and easily attach conductors to the standardized terminals of current transformers.

Another object is to provide a terminal connection by means of which conductor wires or cables of different sizes may be easily and readily connected to the terminals.

A further object is to provide such a terminal connection or coupling by means of which one or more conductor wires or cables may be attached to each terminal.

A still further object of the invention is to provide a terminal connection or coupling by means of which wires located at an angle to the current transformer and leading either from above or below the terminals thereof, may be easily and readily attached to the terminals.

Figure 1:
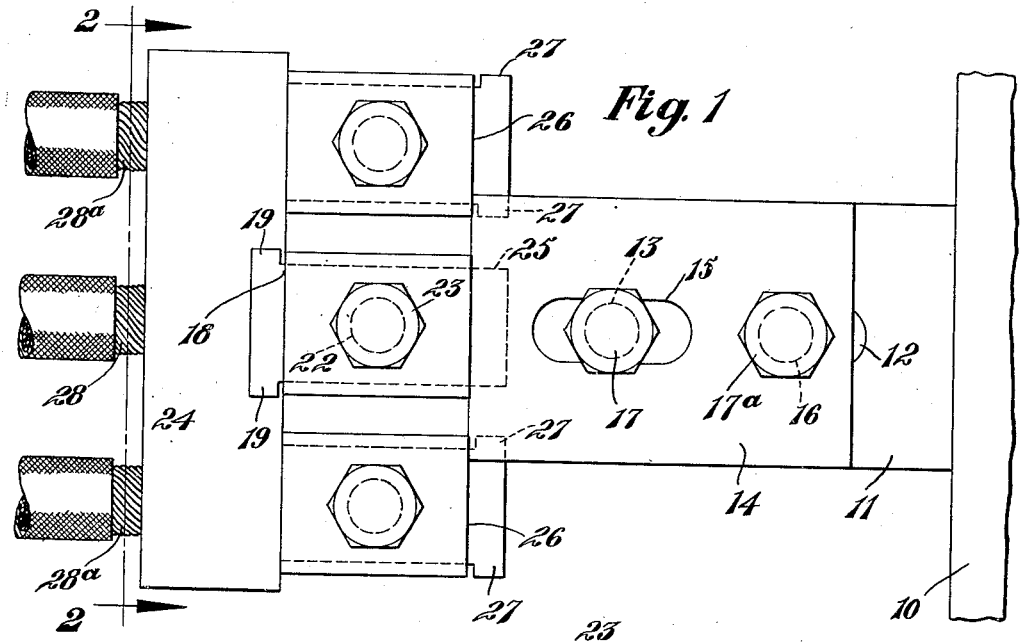
Figure 2:
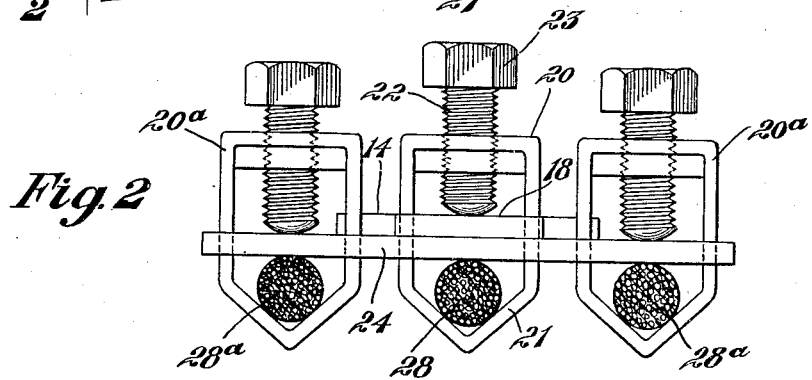
Figure 3:
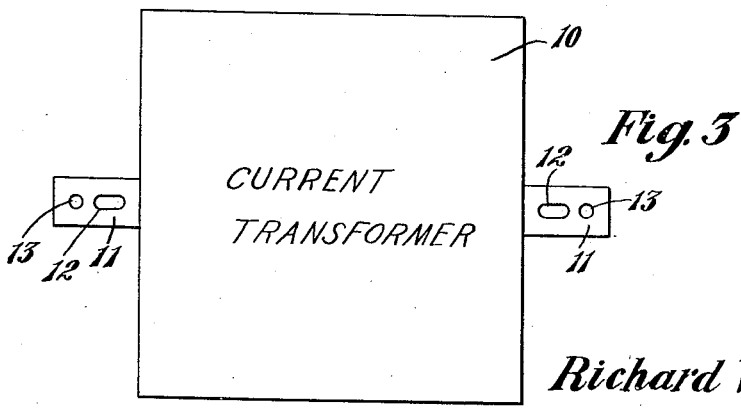

The above objects together with others which will be apparent from the drawings and following description or which may be later referred to may be attained by constructing the improved terminal connection in the manner illustrated in the accompanying drawings in which Figure 1 is a top plan view of the improved terminal connection or coupling showing the same arranged for attaching a plurality of conductor wires or cables to a terminal;

Fig. 2, a sectional elevation taken as on the line 2—2, Fig. 1;

Fig. 3, a small elevation of a current transformer provided with standardized terminals;

Fig. 4, a detached perspective view of the multiple conductor coupling plate which may be used for connecting a plurality of conductor wires or cables to a terminal;

Fig. 5, a detached perspective view of the conductor plate forming a part of the invention;

Fig. 6, a similar view of a modified form of a conductor plate for connecting conductor wires or cables leading from above or below the terminal; and Fig. 7, a detached perspective view of the closed loop or stirrup form of coupling, by means of which the conductor wires or cables are connected to the conductor plate and multiple conductor coupling plate.

Similar numerals refer to similar parts throughout the several views.

A current transformer is conventionally indicated at 10 and provided with standardized terminals 11 which may be in the form of rectangular plates of elongated shape each provided with a central longitudinally disposed slot 12 and a substantially circular aperture 13 spaced therefrom.

The size and shape of these terminals for current transformers are substantially uniform, and various devices have been used for attaching conductor wires or cables thereto, but no satisfactory device has been designed for easily and readily attaching either one or a plurality of conductor cables or wires to the terminals or for attaching cables or wires of different diameters.

Difficulty is also experienced in attaching cables or wires which lead from above or below the terminals. The present invention contemplates the provision of a terminal connection especially adapted for coupling conductor wires or cables to the standardized terminals of current transformers and so arranged that wires or cables of different diameters or one or a plurality of such wires or cables may be quickly and easily attached to the terminals.

The invention also includes means for attaching cables or wires which are located at an angle to the terminal and lead either from above or below the same.

In carrying out the invention a conductor plate 14 formed of copper or the like and of a size and shape similar to the terminal 11 is provided with a central longitudinal slot 15 and a spaced, substantially circular aperture 16 similar to the slot 12 and aperture 13 of the terminal 11, but with the positions reversed with respect thereto.

This conductor plate is adapted to be attached to the terminal 11 in the manner shown in Fig. 1, the conductor plate being placed upon the terminal in such position that a bolt 17 may be located through the slot 15 of the conductor plate and the aperture 13 of the terminal 11, and a similar bolt 17a may be located through the aperture 16 of the conductor plate and the slot 12 of the terminal.

The slots 12 and 15 permit for longitudinal adjustment of the conductor plate relative to the terminal and when the proper adjustment is attained the bolts 17 and 17a may be tightened as by means of ordinary nuts to clamp the conductor plate upon the terminal.

The outer end of the conductor plate 14 is provided with the reduced portion 18 transversely enlarged at its extremity as by the outturned lugs 19.

A closed loop or stirrup coupling 20 loosely encircles the reduced portion 18 of the conductor plate and the walls thereof are inclined or shaped at one end as indicated at 21 to more or less conform to the contour of the terminal end of a conductor wire or cable.

A screw 22 is threaded through the other end of the loop or stirrup 20 and is provided with a head 23 shaped so that a wrench or other suitable tool may be applied to turn the screw against the portion 18 of the conductor plate.

If only a single conductor wire or cable is to be attached to the terminal 11, the terminal end of said wire or cable may be inserted through the lower portion of the loop or stirrup 20 between the portion 18 of the conductor plate and the inclined lower end portion 21 of the loop, and the screw 22 is turned down until the wire or cable is tightly clamped between the portion 18 of the conductor plate and the inclined lower portion of the loop.

If it is desired to attach a plurality of conductor wires or cables, as shown in Figs. 1 and 2 of the drawings, a multiple conductor coupling plate, as indicated generally at 24 and as shown in detail in Fig. 4, is provided.

This coupling plate is provided with a central finger 25 of sufficient width to be slidably received within the loop 20 and with a finger 26 of substantially the same width spaced from each side of the central finger 25 and parallel thereto. The fingers 26 may each be enlarged at their extremities as by the outturned lugs 27.

The finger 25 of the multiple conductor coupling plate 24 is inserted through the loop 20 directly beneath the reduced portion 18 of the conductor plate 14, in the position shown in Figs. 1 and 2, and the terminal end of one of the conductor wires or cables 28 is inserted into the loop beneath the multiple coupling plate 24.

As the screw 22 is tightened it will be seen, as best shown in Fig. 2, that the multiple coupling plate 24 is tightly clamped against the under side of the portion 18 of the conductor plate 14 and the terminal portion of the wire or cable 28 is clamped between the coupling plate 24 and the inclined lower end 21 of the loop 20.

For the purpose of attaching additional conductor wires or cables 28a, loop or stirrup couplings 20a, similar to the loop coupling 20 may be placed around the fingers 26 of the multiple coupling plate, terminal ends of the wires or cables 28a being inserted into the lower portions of the loops and clamped therein beneath the multiple coupling plate as best shown in Fig. 2.

This assembly provides for connecting three conductor wires or cables to the terminal 11. If only two wires or cables are to be used, one of the fingers 26 upon the multiple coupling plate may be dispensed with.

It will be seen that conductor wires or cables of different diameters may be accommodated by properly adjusting the screws of the loop couplings to accommodate the same.

In the event the conductor wires or cables lead from above or below the terminal of the current transformer, a modified form of conductor plate as indicated generally at 14a in Fig. 6 may be substituted for the conductor plate 14.

This modified form of conductor plate may be the same as the conductor plate 14 excepting that the reduced portion 18a thereof extends at a right angle from the outer end thereof.

A loop coupling 20 may be placed upon the reduced portion 18a of the conductor plate 14a for attaching a single conductor wire or cable, or the multiple conductor coupling plate 24 may be attached to the coupling plate 14a in the same manner as above described regarding the plate 14, for attaching a plurality of conductor wires or cables located at an angle to the terminal 11 and leading either from above or below the same, the plate 14a being used in connection with the other parts in the same manner as described above.

From the above it will be evident that one or a plurality of conductor wires or cables of various sizes may be quickly and readily attached to the terminal of a current transformer and may be located either parallel to said terminal or at angles thereto.

I claim:

1. A terminal connection comprising a conductor plate designed to be attached to a terminal, a reduced portion on said conductor plate having outturned lugs at its outer end, a conducting loop mounted around said reduced portion, a screw threaded into one side of said loop for contact with the reduced portion of the conductor plate, a multiple conductor coupling plate having a plurality of fingers, one finger being inserted into said loop beneath said conductor plate from the side opposite the conductor plate, and a second conducting loop mounted around another finger of said multiple conductor coupling plate said last named finger having outturned lugs at its end, the portions of said loops below said fingers being arranged to receive conductor wires.

2. A terminal connection comprising a conductor plate designed to be attached to a terminal, a reduced portion on said conductor plate having outturned lugs at its outer end, a conducting loop mounted around said reduced portion, a screw threaded into one side of said loop for contact with the reduced portion of the conductor plate, a multiple conductor coupling plate having a plurality of fingers, one finger being inserted into said loop beneath said conductor plate from the side opposite said conductor plate, and other conducting loops mounted around the other fingers of said multiple conductor coupling plate said other fingers having outturned lugs at their outer ends, the portions of said loops below said fingers being arranged to receive conductor wires.

3. A terminal connection comprising a conductor plate designed to be attached to a terminal, a reduced portion on said conductor plate and having outturned lugs at its outer end, located at an angle to the body of the plate, a conducting loop mounted around said reduced portion, a screw threaded into one side of said loop for contact with the reduced portion of the conductor plate, a multiple conductor coupling plate having a plurality of fingers, one finger being inserted into said loop beneath said conductor plate from the side opposite the conductor plate, and a second conducting loop mounted around another finger of said multiple conductor coupling plate said last named finger having outturned lugs at its outer end, the portions of said loops below said fingers being arranged to receive conductor wires.

4. A terminal connection comprising a conductor plate designed to be attached to a terminal, a reduced portion on said conductor plate having outturned lugs at its end, a conducting loop mounted around said reduced portion, a screw threaded into one side of said loop for contact with the reduced portion of the conductor plate, a multiple conductor coupling plate having a plurality of fingers, the central finger being inserted into said loop beneath said conductor plate from the side opposite said conductor plate, and other conducting loops mounted around the outer fingers of said multiple conductor coupling plate said outer fingers having outturned lugs at their ends, the portions of said loops below said fingers being arranged to receive conductor wires.

RICHARD W. GRACE.